US008287616B2

(12) United States Patent
Seelmann-Eggebert et al.

(10) Patent No.: US 8,287,616 B2
(45) Date of Patent: Oct. 16, 2012

(54) USE OF NON-IONIC SURFACTANTS IN THE PRODUCTION OF METALS

(75) Inventors: Hans-Peter Seelmann-Eggebert, Limburgerhod (DE); Guenter Oetter, Frankenthal (DE); Arturo Berastain, Lima (PE); Cesar Ostos Rios, Lima (PE)

(73) Assignee: BASF Aktiengesellschaft, Ludwigshafen (DE)

( * ) Notice: Subject to any disclaimer, the term of this patent is extended or adjusted under 35 U.S.C. 154(b) by 21 days.

(21) Appl. No.: 11/722,775

(22) PCT Filed: Dec. 22, 2005

(86) PCT No.: PCT/EP2005/013909
§ 371 (c)(1),
(2), (4) Date: Aug. 9, 2007

(87) PCT Pub. No.: WO2006/069738
PCT Pub. Date: Jul. 6, 2006

(65) Prior Publication Data
US 2008/0196546 A1   Aug. 21, 2008

(30) Foreign Application Priority Data

Dec. 24, 2004 (DE) .................. 10 2004 063 501
Feb. 28, 2005 (DE) .................. 10 2005 009 574

(51) Int. Cl.
*C01B 21/082* (2006.01)
*C01B 31/00* (2006.01)
*C07C 31/02* (2006.01)
*C07C 31/125* (2006.01)
*C07C 381/00* (2006.01)

(52) U.S. Cl. ............... 75/300; 252/182.32; 252/182.34
(58) Field of Classification Search ............ 75/737, 75/735, 738
See application file for complete search history.

(56) References Cited

U.S. PATENT DOCUMENTS

| 1,549,856 | A |   | 8/1925 | Darrow |
| 2,234,140 | A |   | 3/1941 | Falconer |
| 3,756,257 | A |   | 9/1973 | Rice et al. |
| 3,810,834 | A |   | 5/1974 | Jones et al. |
| 4,287,370 | A |   | 9/1981 | Harris et al. |
| 4,929,274 | A | * | 5/1990 | Luttinger .............. 423/25 |
| 5,158,922 | A |   | 10/1992 | Hinney et al. |
| 5,366,016 | A |   | 11/1994 | Fieler et al. |
| 5,434,313 | A |   | 7/1995 | Harrison et al. |
| 5,827,348 | A |   | 10/1998 | Waddell et al. |
| 6,028,229 | A | * | 2/2000 | Bigorra Llosas et al. ..... 568/618 |
| 6,057,284 | A | * | 5/2000 | Baur et al. .................. 510/506 |
| 2003/0192403 | A1 | * | 10/2003 | Burgmayer .................. 75/743 |
| 2005/0215452 | A1 | * | 9/2005 | Ruland et al. .................. 510/421 |
| 2005/0272626 | A1 | * | 12/2005 | Wulff et al. .................. 510/421 |
| 2008/0025890 | A1 |   | 1/2008 | Seelmann-Eggebert et al. |

FOREIGN PATENT DOCUMENTS

| AU | 10968/88 |   | 8/1988 |
| DE | 37 26 121 A1 |   | 2/1989 |
| DE | 40 16 753 A1 |   | 11/1991 |
| DE | 43 25 237 A1 |   | 2/1995 |
| DE | 43 30 359 A1 |   | 3/1995 |
| DE | 43 42 930 A1 |   | 6/1995 |
| DE | 44 27 630 A1 |   | 2/1996 |
| DE | 44 34 463 A1 |   | 3/1996 |
| DE | 195 03 546 A1 |   | 8/1996 |
| DE | 195 48 318 A1 |   | 6/1997 |
| DE | 196 21 843 A1 |   | 12/1997 |
| DE | 197 19 516 A1 |   | 11/1998 |
| DE | 101 02 209 A1 |   | 7/2002 |
| DE | 101 17 273 A1 |   | 10/2002 |
| DE | 102 43 360 A1 |   | 4/2004 |
| DE | 102 43 361 A1 |   | 4/2004 |
| DE | 102 43 362 A1 |   | 4/2004 |
| DE | 102 43 363 A1 |   | 4/2004 |
| DE | 102 43 365 A1 |   | 4/2004 |
| DE | 102 43 366 A1 |   | 4/2004 |
| DE | 10243365 A1 | * | 4/2004 |
| EA | 0 330 075 A2 |   | 8/1989 |
| EP | 0 261 589 A2 |   | 3/1988 |
| EP | 0 538 969 A2 |   | 4/1993 |
| EP | 0 556 162 A1 |   | 8/1993 |
| GB | 1 454 657 |   | 11/1976 |
| WO | WO 95/04024 A1 |   | 2/1995 |
| WO | WO 95/11225 A1 |   | 4/1995 |
| WO | WO 98/06312 A1 |   | 2/1998 |
| WO | WO 99/16775 A1 |   | 4/1999 |
| WO | WO 99/19435 A1 |   | 4/1999 |
| WO | WO 00/74845 A1 |   | 12/2000 |
| WO | WO 01/47472 A2 |   | 7/2001 |
| WO | WO 01/64772 A1 |   | 9/2001 |
| WO | WO 03/091192 | * | 11/2003 |
| WO | WO 2004/055052 A2 |   | 7/2004 |
| WO | WO 2004/099092 A1 |   | 11/2004 |
| ZA | 880823 | * | 2/1988 |
| ZA | 9 109 627 |   | 9/1992 |

OTHER PUBLICATIONS

Argentinian Basic Examination Report issued Jun. 7, 2010 in corresponding Argentinian Application No. P. 05 01 05489.
Raymond E. Kirk et al., Encyclopedia of Chemical Technology (in Spanish), vol. 14, Surface-Active Agents, © 1963, pp. 878-930.
F. R. Morral, "Generalidades Sobre los Procesos de Metalurgia Extractive", Metalurgia General, vol. 1, 1982, pp. 181-185, 192-201 and 328-333, Only in regards to the information disclosed in the Argentinian Basic Examination report issued Jun. 7, 2010 in response to Argentinian application P050105489.
"Ullmann's Encyclopedia";6 Edition; 2000; vol. 4.2.
Kirk-Othmer; "Encyclopedia of Chemical Technology"; Third Edition; Fluorine Compounds, Organic to Gold and Gold Compounds, vol. 11, pp. 972-992, 1984.
Kirk-Othmer; "Encyclopedia of Chemical Technology"; Third Edition; Silver and Silver Alloys to Sulfolanes and Sulfones; vol. 21, pp. 1-15, 1984.

(Continued)

*Primary Examiner* — Roy King
*Assistant Examiner* — Jared Wood
(74) *Attorney, Agent, or Firm* — Oblaon, Spivak, McClelland, Maier & Neustadt, L.L.P.

(57) ABSTRACT

A composition for cyanide leaching which comprises at least one nonionic surfactant and a process for extracting metals using the abovementioned composition are described.

20 Claims, No Drawings

OTHER PUBLICATIONS

Kurt Kosswig; "Overview of Surfactants"; Jun. 15, 2007; Ullmann's Encyclopedia of Industrial Chemisry; XP 002375392; pp. 1-3.

Edited by Fathi Habashi; "Handbook of Extractive Metallurgy"; 1997; vol. III, XP 002375446 (Wiley-VCH), pp. 1184-1199.

Edited by Fathi Habashi; "Handbook of Extractive Metallurgy"; 1997: vol. III, XP 002375446 (Wiley-VCH), pp. 1220-1225.

Kurt Kosswig; "Ullmann's Encyclopedia of Industrial Chemistry"; Jun. 15, 2000; Wiley-VCH-XP-002375395; Nonionic Surfactants; pp. 1-14.

Kurt Kosswig; "Ullmann's Encyclopedia of Industrial Chemistry"; Jun. 15, 2000; Wiley-VCH-XP-002375392; Interfacial Phenomena; pp. 1-5.

* cited by examiner

USE OF NON-IONIC SURFACTANTS IN THE PRODUCTION OF METALS

The present invention relates to an aqueous cyanide-containing composition which comprises at least one nonionic surfactant, and to a process for extracting metals, in particular gold and/or silver, from materials or minerals which comprise the corresponding metal with the aid of this aqueous cyanide-containing composition.

Gold is among the rarest elements in our world. Thus, for example, the proportion of gold in the solid Earth's crust is about 4 mg/t (4 ppb). Gold is also present in quartz rock in the form of lodes, veins, etc. Here, the gold is often accompanied by pyrites, arsenopyrite, copper ores and silver ores. Most gold occurs in elemental form, although most gold particles are macroscopically small. Gold is generally alloyed with silver but may also comprise copper, platinum and further metals as impurities. Some gold minerals are also found in nature. These are in particular tellurides, for example calayerite ($AuTe_2$), sylvanite ($AgAuTe_4$) and nagyagite [$AuTe_2$.6 Pb(S, Te)].

Gold extraction is effected only rarely by gold washing. Today, substantially two industrial processes play an important role. For this purpose, gold-containing material is first extracted industrially by mining the ore, and the extracted gold-containing ore is subjected to amalgamation or cyanide leaching.

In amalgamation, the gold-containing rock is crushed in mills and mixed with water and mercury. The gold forms with the mercury an alloy (amalgam) from which the mercury can be distilled off by distillation at 600° C. As a result of the process, about two thirds of the gold can be extracted from the rock.

In cyanide leaching, which is described, for example, in Ullmann's Encyclopedia, 6th Edition, 2000, Volume 4.2 (electronic version) or in Kirk-Othmer, Encyclopedia of Chemical Technology, 3rd Edition, Vol. 11, pages 972 to 992, and Vol. 21, pages 1 to 15, a sodium or potassium cyanide solution is added to the finely milled rock while supplying atmospheric oxygen and, if appropriate, in the presence of lime. The gold forms a complex cyanide compound according to the following equation:

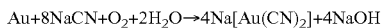

The pure gold can be recovered from the complex cyanide compound by reduction (for example using zinc turnings). The gold settles as a sponge on the bottom during this reduction. The precipitate is filtered, dried and roasted, then melted with the aid of a flux, such as borax, and cast into ingots. Alternative recovery processes are the selective adsorption onto active carbon (e.g. carbon in pulp process—CIP) or ion exchangers (e.g. resin in pulp process—RIP) with subsequent desorption using concentrated cyanide solution or zinc cyanate in the case of ion exchangers. The gold ions can be reduced from the cyanide complexes electrolytically or by adding zinc powder. The cyanide leaching is preferably carried out as heap leaching. Rocks are formed into heaps of in general from 100 000 to 500 000 t and then sprayed from above with the cyanide liquor so that the cyanide liquor can percolate or trickle through the rock. The mother liquor enriched with gold collects at the bottom of the heap.

The process most frequently carried out in practice is cyanide leaching, which utilizes the good complexing properties of cyanide ions for dissolving metallic gold and separating gold ions from their natural chemical partners in the ore.

Silver, too, is preferably extracted by the process of cyanide leaching, often together with gold. The material comminuted to a fine sludge is leached with 0.1 to 0.2% strength sodium cyanide solution with thorough ventilation, both metallic silver and silver sulfide and silver chloride going into solution as dicyanoargentate (I):

 (1)

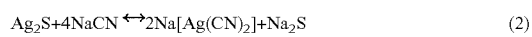 (2)

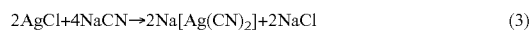 (3)

Since the reaction (2) leads to an equilibrium, the sodium sulfide $Na_2S$ formed in the leaching of sulfidic silver ores must be oxidized by blowing in air ($2\ S^{2-}+2\ O_2+H_2O\rightarrow S_2O_3^{2-}+2OH^-$) or precipitated by adding lead salt ($Pb^{2+}+S^{2-}\rightarrow PbS$) and thus removed from the equilibrium. The (nobler) silver is precipitated from the resulting clear liquors by introducing (less noble) zinc or aluminum dust ($2\ Na[Ag(CN)_2]+Zn\rightarrow Na_2[Zn(CN)_4]+2\ Ag$), the slurry is then filtered through filter presses and the press cake thus obtained is melted.

However, the large amounts of cyanide salts which are required for separating the metal from the metal-containing materials are disadvantageous in the cyanide leaching. Thus, for example for extracting gold or silver, up to 300 g of cyanide per metric ton of material are required, depending on the gold- or silver-containing material, it still not being possible to dissolve the gold or silver completely out of the starting material even when large amounts of cyanide salts are used. Usually, only from 60 to 90% of the gold or silver present are removed from the original material.

Owing to the high toxic effect of cyanide salts, such large amounts are moreover ecologically unsafe.

Furthermore, cyanide leaching, which is frequently carried out as heap leaching, requires a considerable amount of time. Thus, the time which is required for a conventional leaching process is from 30 to 90 days, depending on the starting material.

In the prior art, the addition of surfactants to the cyanide liquor is recommended for improving the effectiveness of the cyanide leaching, with the result that the required amount of cyanide and the required duration of the cyanide leaching can be decreased and the achievable yield of gold or silver can be increased.

Thus, U.S. Pat. No. 5,827,348 describes the use of fluoroaliphatic surfactants for cyanide leaching, a cyanide-containing liquor which, owing to the addition of surfactant, has a surface tension of less than 40 Dyn/cm being used.

ZA 8800823 A describes the use of sodium dioctylsulfosuccinates, ethoxylated alkylphenols and fatty acids as assistants in gold extraction.

ZA 9109627 A describes the use of endcapped alkyl ether ethoxylates as assistants in cyanide leaching for extraction of gold.

U.S. Pat. No. 4,929,274 describes a process for heap leaching, in which a surfactant is used in the cyanide-containing liquor. The surfactant comprises ethoxylated fatty esters, alkylsulfosuccinates or fatty alcohols.

US 2003/0192403 A1 also describes the use of surfactants as extraction assistants in gold extraction. The surfactants used are ethoxylated aliphatic alcohols.

In spite of the use of surfactants during the cyanide leaching, the metal yields, for example of gold or silver, based on the starting material used, are still unsatisfactory. The required duration of leaching is also worthy of improvement. Moreover, there is still a need to reduce the required amounts of cyanide salts in the leaching solutions.

The described processes for use of the surfactants are used industrially only to a small extent since the working-up of the metal-containing cyanide liquor is complicated by the use of the surfactants.

It is therefore the object to provide a composition and a process which preferably make it possible to increase the yields of metal, in particular of gold and/or silver, based on the starting material used. Moreover, the composition or the process should preferably lead to a reduction in the required duration of leaching and the amount of cyanide required for leaching. Furthermore, the working-up of the cyanide liquor must not be adversely affected by the surface-active agent present therein.

The object is achieved by an aqueous cyanide-containing composition which comprises at least one nonionic surfactant.

In the composition, the nonionic surfactant, in a concentration of from 0.01 to 0.2% by weight, particularly preferably from 0.01 to 0.1% by weight, in particular from 0.01 to 0.05% by weight in an aqueous solution adjusted to a pH of from 9.8 to 10.2 with NaOH, at 23° C., leads to a reduction in the contact angle on glass after 1 second, particularly preferably after 0.5 second, by at least 10°, particularly preferably at least 20°, in particular at least 30°, especially at least 40°.

In a preferred embodiment of the present invention, the resulting aqueous cyanide-containing composition comprising the nonionic surfactant has a contact angle on glass of less than 40°, particularly preferably less than 20°, in particular less than 10°.

The contact angle is measured on an extra-white glass slide from Gerhard Menzel Glasbearbeitungswerk GmbH & Co. KG, Braunschweig, having a slide thickness of 1 mm. The approximate specification of the glass slide is as follows:
Approximate Chemical Composition:

| Silicon dioxide | $SiO_2$ | 72.20% |
|---|---|---|
| Sodium oxide | $Na_2O$ | 14.30% |
| Potassium oxide | $K_2O$ | 1.20% |
| Calcium oxide | CaO | 6.40% |
| Magnesium oxide | MgO | 4.30% |
| Aluminum oxide | $Al_2O_3$ | 1.20% |
| Iron oxide | $Fe_2O_3$ | 0.03% |
| Sulfur trioxide | $SO_3$ | 0.30% |

Other Properties of the Glass are as Follows:

| Mean coefficient of expansion (20-300°) | $90.6 \times 10^{-7}/°$ C. |
|---|---|
| Expansion point log n 14.5 | 513° C. |
| Littleton softening point | 720° C. |

Radiation of Second Mirror Surface:
Total solar reflection (M=2) as a proportion of the normal reflection of a second mirror surface at solar elevation of 30°: 95.3%
Light Transmittance:
Total solar transmittance (M=2) as a proportion of the normal transmittance at solar elevation of 30°: 91.6%
Refractive Index

| At $\lambda$ = 546.07 nm | 1.5171 |
|---|---|
| Impermeability | 2.479 |

The glass slide is cleaned with acetone and dried in a drying oven at 70° C. for 2 hours before the measurement of the contact angle.

The aqueous solution used for determining the contact angle is free of cyanides.

In the composition according to the invention, a nonionic surfactant is used. The nonionic surfactant is preferably chosen so that, under the alkaline conditions of the metal leaching, in particular of gold and/or silver, with a pH of, preferably, from 8 to 13, particularly preferably from 9 to 12, in particular from 9 to 11, it leads to an increase in the metal extraction and, if appropriate, a reduction in the duration of leaching.

In a particularly preferred embodiment, the nonionic surfactant used is biodegradable, in particular readily biodegradable.

The nonionic surfactant is preferably selected from the group consisting of alcohol alkoxylates, alkylphenol alkoxylates, alkylpolyglucosides, N-alkylpolyglucosides, N-alkylglucamides, fatty acid alkoxylates, fatty acid polyglycol esters, fatty acid amine alkoxylates, fatty acid amide alkoxylates, fatty acid alkanolamide alkoxylates, N-alkoxypolyhydroxy-fatty acid amides, N-aryloxypolyhydroxy-fatty acid amides, block copolymers of ethylene oxide, propylene oxide and/or butylene oxide, polyisobutene alkoxylates, polyisobutene/maleic anhydride derivatives, fatty acid glycerides, sorbitan esters, polyhydroxy-fatty acid derivatives, polyalkoxy-fatty acid derivatives and bisglycerides.

Suitable Nonionic Surfactants are in Particular:
  alkoxylated $C_4$- to $C_{22}$-alcohols, such as fatty alcohol alkoxylates or oxo alcohol alkoxylates. These may be alkoxylated with ethylene oxide, propylene oxide and/or butylene oxide. Surfactants which may be used here are all alkoxylated alcohols which comprise at least two added molecules of one of the above-mentioned alkylene oxides. Block polymers of ethylene oxide, propylene oxide and/or butylene oxide or adducts which comprise said alkylene oxides in random distribution are suitable here. The nonionic surfactants generally comprise from 2 to 50, preferably from 3 to 20, mol of at least one alkylene oxide per mole of alcohol. The alcohols preferably have 10 to 18 carbon atoms. Depending on the type of alkoxylation catalyst used in the preparation, on the type of preparation process and on the method of working up, the alkoxylates have a broad or narrow alkylene oxide homolog distribution;
  alkylphenol alkoxylates, such as alkylphenol ethoxylates having $C_6$- to $C_{14}$-alkyl chains and from 5 to 30 alkylene oxide units;
  alkylpolyglucosides having 8 to 22, preferably 10 to 18, carbon atoms in the alkyl chain and in general 1 to 20, preferably 1.1 to 5, glucoside units sorbitan alkanoates, including in alkoxylated form;
  N-alkylglucamides, fatty acid alkoxyaltes, fatty acid amine alkoxylates, fatty acid amide alkoxylates, fatty acid alkanolamide alkoxylates, alkoxylated, block copolymers of ethylene oxide, propylene oxide and/or butylene oxide, polyisobutene ethoxylates, polyisobutene/maleic anhydride derivatives, optionally alkoxylated monoglycerides, glyceryl monostearates, sorbitan esters and bisglycerides.

Particularly suitable nonionic surfactants are alkyl alkoxylates or mixtures of alkyl alkoxylates, as described, for example, in DE-A 102 43 363, DE-A 102 43 361, DE-A 102 43 360, DE-A 102 43 365, DE-A 102 43 366, DE-A 102 43 362 or DE-A 43 25 237. These are alkoxylation products which were obtained by reaction of alkanols with alkylene oxides in the presence of alkoxylation catalysts or are mixtures of alkoxylation products. Particularly suitable initiator alcohols are the so-called Guerbet alcohols, in particular ethylhexanol, propylheptanol and butyloctanol. Propylheptanol is particularly preferred. Preferred alkylene oxides are propylene oxide and ethylene oxide, alkyl alkoxylates having a direct link of a preferably short polypropylene oxide block to the initiator alcohol, as described in DE-A 102 43 365, for example, being preferred in particular because of their low residual alcohol content and their good biodegradability.

A preferred class of suitable nonionic surfactants comprises the alcohol alkoxylates of the general formula (I)

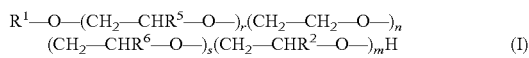

$$R^1-O-(CH_2-CHR^5-O-)_r(CH_2-CH_2-O-)_n(CH_2-CHR^6-O-)_s(CH_2-CHR^2-O-)_mH \quad (I)$$

where
$R^1$ is at least singly branched $C_{4-22}$-alkyl or -alkylphenol,
$R^2$ is $C_{3-4}$-alkyl
$R^5$ is $C_{1-4}$-alkyl
$R^6$ is methyl or ethyl
n has a mean value of from 1 to 50
m has a mean value of from 0 to 20, preferably from 0.5 to 20
r has a mean value of from 0 to 50
s has a mean value of from 0 to 50,
m being at least 0.5 if $R^5$ is methyl or ethyl or r has the value 0.

A mixture of from 20 to 95% by weight, preferably from 30 to 95% by weight, of at least one alcohol alkoxylate above and from 5 to 80% by weight, preferably from 5 to 70% by weight, of a corresponding alcohol alkoxylate in which $R^1$ is, however, a straight-chain alkyl radical having the same number of carbon atoms is furthermore possible.

Alcohol Alkoxylates of the General Formula (II)

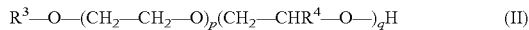

$$R^3-O-(CH_2-CH_2-O)_p(CH_2-CHR^4-O-)_qH \quad (II)$$

where
$R^3$ is branched or straight-chain $C_{4-22}$-alkyl or -alkylphenol
$R^4$ is $C_{3-4}$-alkyl
p has a mean value of from 1 to 50, preferably from 4 to 15
q has a mean value of from 0.5 to 20, preferably from 0.5 to 4, more preferably from 0.5 to 2,
are furthermore possible.

A mixture of from 5 to 95% by weight of at least one branched alcohol alkoxylate (II), as described immediately above, and from 5 to 95% by weight of a corresponding alcohol alkoxylate in which, however, a straight-chain alkyl radical is present instead of a branched alkyl radical is furthermore possible.

In the alcohol alkoxylates of the general formula (I), $R^2$ is preferably propyl, in particular n-propyl.

In the alcohol alkoxylates of the general formula (II), n preferably has a mean value of from 4 to 15, particularly preferably from 6 to 12, in particular from 7 to 10.

m preferably has a mean value of from 0.5 to 4, particularly preferably from 0.5 to 2, in particular from 1 to 2. The expression "mean value" relates to industrial products in which different numbers of alkylene oxide units may be present in the individual molecules. It describes the proportion of corresponding alkylene oxide units present on average in industrial products. A value of 0.5 therefore means that on average every second molecule carries a corresponding unit. According to a preferred embodiment of the invention, the lower limit 1 replaces the lower limit of 0.5 for the indices n, m, p and q.

r is preferably 0. s is preferably 0.

The radical $R^1$ is preferably a $C_{8-15}$-alkyl, particularly preferably $C_{8-13}$-alkyl, in particular $C_{8-12}$-alkyl radical, which is at least singly branched. A plurality of branches may also be present.

$R^5$ is preferably methyl or ethyl, in particular methyl.
$R^6$ is preferably ethyl.

Compounds having straight-chain and having branched alcohol radicals $R^1$ are present in the mixtures. This is the case, for example, with oxo alcohols which have a proportion of linear and a proportion of branched alcohol chains. For example, a $C_{13/15}$-oxo alcohol frequently has about 60% by weight of completely linear alcohol chains but in addition about 40% by weight of α-methyl-branched and $C_{\geq 2}$-branched alcohol chains.

In the alcohol alkoxylates of the general formula (II), $R^3$ is preferably a branched or straight-chain $C_{8-15}$-alkyl radical, particularly preferably a branched or straight-chain $C_{8-13}$-alkyl radical and in particular a branched or straight-chain $C_{8-12}$-alkyl radical. $R^4$ is preferably propyl, in particular n-propyl. p preferably has a mean value of from 4 to 15, particularly preferably a mean value of from 6 to 12 and in particular a mean value of from 7 to 10. q preferably has a mean value of from 0.5 to 4, particularly preferably from 0.5 to 2, in particular from 1 to 2.

Similarly to the alcohol alkoxylates of the general formula (I), the alcohol alkoxylates of the general formula (II) may also be present as mixtures with straight-chain and branched alcohol radicals.

Suitable alcohol components on which the alcohol alkoxylates are based are not only pure alkanols but also homologous mixtures having a range of carbon atoms. Examples are $C_{8-10}$-alkanols, $C_{10/12}$-alkanols, $C_{13/15}$-alkanols and $C_{12/15}$-alkanols. Mixtures of a plurality of alkanols are also possible.

The above alkanol alkoxylates or mixtures according to the invention are preferably prepared by reacting alcohols of the general formula $R^1$—OH or $R^3$—OH or mixtures of corresponding branched and straight-chain alcohols, if appropriate first with $C_{3-6}$-alkylene oxide, then with ethylene oxide and subsequently, if appropriate, with $C_{3-4}$-alkylene oxide and then with a corresponding $C_{5-6}$-alkylene oxide. The alkoxylations are preferably carried out in the presence of alkoxylation catalysts. In particular, basic catalysts, such as potassium hydroxide, are used. By means of special alkoxylation catalysts, such as modified bentonites or hydrotalcites, as described, for example, in WO 95/04024, the random distribution of the amounts of the incorporated alkylene oxides can be greatly restricted so that narrow-range alkoxylates are obtained.

A particular embodiment of the present invention relates to alkoxylate mixtures comprising alkoxylates of the general formula (III)

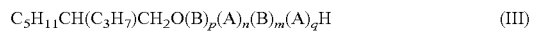

$$C_5H_{11}CH(C_3H_7)CH_2O(B)_p(A)_n(B)_m(A)_qH \quad (III)$$

where
A is ethyleneoxy
B, in each case independently, is $C_{3-10}$-alkyleneoxy, preferably propyleneoxy, butyleneoxy, pentyleneoxy or mixtures thereof,
groups A and B being present in the form of blocks in the stated sequence,
p is a number from 0 to 10
n is a number greater than 0 to 20
m is a number greater than 0 to 20
q is a number greater than 0 to 10
p+n+m+q is at least 1,
from 70 to 99% by weight of alkoxylates A1 in which $C_5H_{11}$ has the meaning n-$C_5H_{11}$ and from 1 to 30% by weight of alkoxlates A2 in which $C_5H_{11}$ has the meaning $C_2H_5CH(CH_3)CH_2$ and/or $CH_3CH(CH_3)CH_2CH_2$ being present in the mixture.

In the general formula (III), p is a number from 0 to 10, preferably from 0 to 5, in particular from 0 to 3. If blocks $(B)_p$ are present, p is preferably a number from 0.1 to 10, particularly preferably from 0.5 to 5, in particular from 1 to 3.

In the general formula (III), n is preferably a number in the range from 0.25 to 10, in particular from 0.5 to 7, m is preferably a number in the range from 2 to 10, in particular from 3 to 6. B is preferably propyleneoxy and/or butyleneoxy, especially propyleneoxy at both positions.

q is preferably a number in the range from 1 to 5, particularly preferably in the range from 2 to 3.

The sum p+n+m+q is at least 1, preferably from 3 to 25, particularly preferably from 5 to 15, in particular from 7 to 13.

Preferably 3 or 4 alkylene oxide blocks are present in the alkoxylates. According to an embodiment, adjacent to the alcohol radical are initially ethyleneoxy units, adjacent thereto propylene oxide units and adjacent thereto ethyleneoxy units. According to a further embodiment, adjacent to the alcohol radical are initially propyleneoxy units, then ethyleneoxy units, then propyleneoxy units and finally ethyleneoxy units. Instead of the propyleneoxy units, the other alkyleneoxy units stated can also be present.

p, n, m and q have a mean value which is an average for the alkoxylates. p, n, m and q may therefore also deviate from integral values. In the alkoxylation of alkanols, a distribution of the degree of alkoxylation which can be adjusted to a certain extent by using different alkoxylation catalysts is generally obtained. Through the choice of suitable amounts of groups A and B, the property spectrum of the alkoxylate mixtures according to the invention can be adapted according to practical requirements.

The alkoxylate mixtures are obtained by alkoxylation of the parent alcohols $C_5H_{11}CH(C_3H_7)CH_2OH$. The starting alcohols can be obtained by mixing the individual components so that the ratio according to the invention results. They can be prepared by aldol condensation of valeraldehyde and subsequent hydrogenation. The preparation of valeraldehyde and the corresponding isomers is effected by hydroformylation of butene, as described, for example, in U.S. Pat. No. 4,287,370; Beilstein E IV 1, 32 68, Ullmanns Encyclopedia of Industrial Chemistry, 5th Edition, Volume A1, pages 323 and 328 et seq. The following aldol condensation is described, for example, in U.S. Pat. No. 5,434,313 and Römpp, Chemie Lexikon, 9th Edition, key word "Aldol-Addition", page 91. The hydrogenation of the aldol condensate follows general hydrogenation conditions.

Furthermore, 2-propylheptanol can be prepared by condensation of 1-pentanol (as a mixture of the corresponding methylbutan-1-ols) in the presence of KOH at elevated temperatures, cf. for example Marcel Guerbet, C.R. Acad Sci Paris 128, 511, 1002 (1899). Furthermore, reference may be made to Römpp, Chemie Lexikon, 9th Edition, Georg Thieme Verlag Stuttgart, and the citations mentioned there, and Tetrahedron, Vol. 23, pages 1723 to 1733.

In the general formula (III), the radical $C_5H_{11}$ may have the meaning n-$C_5H_{11}$, $C_2H_5CH(CH_3)CH_2$ or $CH_3CH(CH_3)CH_2CH_2$. The alkoxylates are mixtures,
from 70 to 99% by weight, preferably from 85 to 96% by weight, of alkoxylates A1 in which $C_5H_{11}$ has the meaning n-$C_5H_{11}$ and
from 1 to 30% by weight, preferably from 4 to 15% by weight, of alkoxylates A2 in which $C_5H_{11}$ has the meaning $C_2H_5CH(CH_3)CH_2$ and/or $CH_3CH(CH_3)CH_2CH_2$ being present.

The radical $C_3H_7$ preferably has the meaning n-$C_3H_7$.

The alkoxylation is preferably catalyzed by strong bases which are expediently added in the form of an alkali metal alcoholate, alkali metal hydroxide or alkaline earth metal hydroxide, as a rule in an amount of from 0.1 to 1% by weight, based on the amount of the alkanol $R^2$—OH (cf. G. Gee et al., J. Chem. Soc. (1961), page 1345; B. Wojtech, Makromol. Chem. 66, (1966), page 180).

An acid catalysis of the addition reaction is also possible. In addition to Bronstedt acids, Lewis acids, such as, for example, $AlCl_3$ or $BF_3$ dietherate, $BF_3$, $BF_3H_3PO_4$, $SbCl_4·2H_2O$ or hydrotalcite are also suitable (cf. P. H. Plesch, The Chemistry of Cationic Polymerization, Pergamon Press, New York (1963)). Double metal cyanide (DMC) compounds are also suitable as the catalyst.

All suitable compounds known to the person skilled in the art can in principle be used as the DMC compound.

DMC compounds suitable as a catalyst are described, for example, in WO 99/16775 and DE-A-101 17 273. Particularly suitable catalysts for the alkoxylation are double metal cyanide compounds of the general formula (IV):

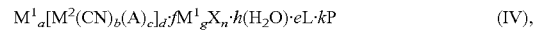

$$M^1_a[M^2(CN)_b(A)_c]_d·fM^1_gX_n·h(H_2O)·eL·kP \qquad (IV),$$

where
$M^1$ is at least one metal ion selected from the group consisting of $Zn^{2+}$, $Fe^{2+}$, $Fe^{3+}$, $Co^{3+}$, $Ni^{2+}$, $Mn^{2+}$, $Co^{2+}$, $Sn^{2+}$, $Pb^{2+}$, $Mo^{4+}$, $Mo^{6+}$, $Al^{3+}$, $V^{4+}$, $V^{5+}$, $Sr^{2+}$, $W^{4+}$, $W^{6+}$, $Cr^{2+}$, $Cr^{3+}$, $Cd^{2+}$, $Hg^{2+}$, $Pd^{2+}$, $pt^{2+}$, $V^{2+}$, $Mg^{2+}$, $Ca^{2+}$, $Ba^{2+}$, $Cu^{2+}$, $La^{3+}$, $Ce^{3+}$, $Ce^{4+}$, $Eu^{3+}$, $Ti^{3+}$, $Ti^{4+}$, $Ag^+$, $Rh^{2+}$, $Rh^{3+}$, $Ru^{2+}$ and $Ru^{3+}$,
$M^2$ is at least one metal ion selected from the group consisting of $Fe^{2+}$, $Fe^{3+}$, $Co^{2+}$, $Co^{3+}$, $Mn^{2+}$, $Mn^{3+}$, $V^{4+}$, $V^{5+}$, $Cr^{2+}$, $Cr^{3+}$, $Rh^{3+}$, $Ru^{2+}$ and $Ir^{3+}$,
A and X, independently of one another, are an anion selected from the group consisting of halide, hydroxide, sulfate, carbonate, cyanide, thiocyanate, isocyanate, cyanate, carboxylate, oxalate, nitrate, nitrosyl, hydrogen sulfate, phosphate, dihydrogen phosphate, hydrogen phosphate and bicarbonate,
L is a water-miscible ligand selected from the group consisting of alcohols, aldehydes, ketones, ethers, polyethers, esters, polyesters, polycarbonate, ureas, amides, primary, secondary and tertiary amines, ligands comprising pyridine nitrogen, nitriles, sulfides, phosphides, phosphites, phosphanes, phosphonates and phosphates,
k is a fraction or integer greater than or equal to zero and P is an organic additive,
a, b, c, d, g and n are selected so that the electroneutrality of the compound (I) is ensured, it being possible for c to be 0,
e, the number of ligand molecules, is a fraction or integer greater than 0 or is 0,
f and h, independently of one another, are a fraction or integer greater than 0 or are 0.

The following may be mentioned as organic additives P: polyether, polyester, polycarbonates, polyalkylene glycol sorbitan ester, polyalkylene glycol glycidyl ether, polyacrylamide, poly(acrylamide-co-acrylic acid), polyacrylic acid, poly(acrylamide-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose, polyacetates, ionic surface-active and interface-active compounds, gallic acid or its salts, esters or amides, carboxylic esters of polyhydric alcohols and glycosides.

These catalysts may be crystalline or amorphous. Where k is zero, crystalline double metal cyanide compounds are preferred. Where k is greater than zero, crystalline, semicrystalline and substantially amorphous catalysts are preferred.

Among the modified catalysts, there are various preferred embodiments. A preferred embodiment comprises catalysts of the formula (IV) in which k is greater than zero. The preferred catalyst then comprises at least one double metal cyanide compound, at least one organic ligand and at least one organic additive P.

In another preferred embodiment, k is zero, e is optionally also zero and X is exclusively a carboxylate, preferably formate, acetate and propionate. Such catalysts are described in WO 99/16775. In this embodiment, crystalline double metal cyanide catalysts are preferred. Double metal cyanide catalysts as described in WO 00/74845, which are crystalline or lamellar, are furthermore preferred.

The preparation of the modified catalysts is effected by combining a metal salt solution with a cyanometallate solution which may optionally comprise both an organic ligand L and an organic additive P. The organic ligand and optionally the organic additive are then added. In a preferred embodiment of the catalyst preparation, an inactive double metal cyanide phase is first prepared and this is then converted into an active double metal cyanide phase by recrystallization, as described in PCT/EP01/01893.

In another preferred embodiment of the catalysts, f, e and k are not zero. These are double metal cyanide catalysts which comprise a water-miscible organic ligand (in general in amounts of from 0.5 to 30% by weight) and an organic additive (in general in amounts of from 5 to 80% by weight), as described in WO 98/06312. The catalysts can be prepared either with vigorous stirring (24 000 rpm using a Turrax) or with stirring, as described in U.S. Pat. No. 5,158,922.

Particularly suitable catalysts for the alkoxylation are double metal cyanide compounds which comprise zinc, cobalt or iron or two thereof. For example, Prussian Blue is particularly suitable.

Crystalline DMC compounds are preferably used. In a preferred embodiment, a crystalline DMC compound of the Zn—Co type, which comprises zinc acetate as a further metal salt component, is used as the catalyst. Such compounds are crystallized with a monoclinic structure and have a lamellar habit. Such compounds are described, for example, in WO 00/74845 or PCT/EP01/01893.

DMC compounds suitable as a catalyst can be prepared in principle by all methods known to the person skilled in the art. For example, the DMC compounds can be prepared by direct precipitation, by the incipient wetness method or by preparation of a precursor phase and subsequent recrystallization.

The DMC compounds can be used as a powder, paste or suspension or can be shaped to give a molding, introduced into moldings, foams or the like or applied to moldings, foams or the like.

The catalyst concentration used for the alkoxylation, based on the final quantity range, is typically less than 2000 ppm (i.e. mg of catalyst per kg of product), preferably less than 1000 ppm, in particular less than 500 ppm, particularly preferably less than 100 ppm, for example less than 50 ppm or 35 ppm, particularly preferably less than 25 ppm.

The addition reaction is carried out at temperatures of from 90 to 240° C., preferably from 120 to 180° C., in a closed vessel. The alkylene oxide or the mixture of different alkylene oxides is added to the mixture of alkanol mixture according to the invention and alkali under the vapor pressure of the alkylene oxide mixture which prevails at the chosen reaction temperature. If desired, the alkylene oxide can be diluted with up to about 30 to 60% of an inert gas. This provides additional safety with regard to prevention of explosive polyaddition of the alkylene oxide.

If an alkylene oxide mixture is used, polyether chains in which the different alkylene oxide building blocks are virtually randomly distributed are formed. Variations in the distribution of the building blocks along the polyether chain are the result of different reaction rates of the components and can also be achieved randomly by continuous feeding of an alkylene oxide mixture of program-controlled composition. If the different alkylene oxides are reacted in succession, polyether chains having a block-like distribution of alkylene oxide building blocks are obtained.

The length of the polyether chains varies randomly within the reaction product about a mean value of the stoichiometric value substantially resulting from the added amount.

Preferred alkoxylate mixtures of the general formula (I) can be obtained by reacting alcohols of the general formula $C_5H_{11}CH(C_3H_7)CH_2OH$ with propylene oxide/ethylene oxide in the abovementioned sequence under alkoxylation conditions. Suitable alkoxylation conditions are described above and in Nikolaus Schönfeldt, Grenzflächenaktive Äthylenoxid-Addukte, Wissenschaftliche Verlagsgesellschaft mbH Stuttgart 1984. As a rule, the alkoxylation is carried out in the presence of basic catalysts, such as KOH, in the absence of a solvent. The alkoxylation can, however, also be carried out with the concomitant use of a solvent. A polymerization of the alkylene oxide is initiated in which a random distribution of homologs inevitably occurs, the mean value of which is specified here with p, n, m and q.

In the case of a preferred initially performed propoxylation and subsequent ethoxylation, the content of residual alcohol in the alkoxylates can be reduced since propylene oxide undergoes addition more uniformly at the alcohol component. In contrast, ethylene oxide reacts preferentially with ethoxylates, so that, when ethylene oxide is used initially for the reaction with the alkanols, a broader homolog distribution may result. The alcohol mixtures used according to the invention have, as a rule, a natural odor which can be very substantially suppressed by the complete alkoxylation.

Furthermore, block-like isotridecanol alkoxylates of the general formula (V)

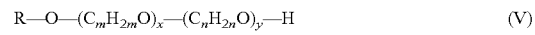

$$R\text{—}O\text{—}(C_mH_{2m}O)_x\text{—}(C_nH_{2n}O)_y\text{—}H \quad\quad (V)$$

may be present, where

R is an isotridecyl radical, m is the number 2 and at the same time n is the number 3 or 4 or m is the number 3 or 4 and at the same time n is the number 2 and x and y, independently of one another, are numbers from 1 to 20, the variable x being greater than or equal to y where m=2/n=3 or 4.

These block-like isotridecanol alkoxylates are described, for example, in DE 196 21 843 A1, the entire disclosure content of which in this context is hereby incorporated by reference in the present invention.

The isotridecanol on which the alcohol component is based (isotridecyl alcohol) is of synthetic origin and is prepared by oligomerization of suitable lower olefin building blocks and subsequent oxo synthesis (hydroformylation). Thus, isobutylene, 1-butylene, 2-butylene or mixtures thereof can be catalytically trimerized, propylene can be catalytically tetramerized or 2-methyl-1-pentene can be catalytically dimerized. The $C_{12}$-olefins thus obtainable are then converted into the homologous $C_{13}$-alcohol, for example by means of CO and $H_2$ over a suitable catalyst.

The main amount of the isotridecanol consists of primary $C_{13}$-alkanols having at least 3, in particular 4, branches (alkyl side chains). As a rule, they are tetramethylnonanols, e.g. 2,4,6,8-tetramethyl-1-nonanol or 3,4,6,8-tetramethyl-1-nonanol. Ethyldimethyl-nonanols, such as 5-ethyl-4,7-dimethyl-1-nonanol, may also be present.

However, a suitable parent alcohol component is not only pure isotridecanol but also mixtures of homologs of branched $C_{11}$- to $C_{14}$-alkanols which comprise isotridecanol as the main component. Such mixtures of homologs form under certain conditions in the above-described oligomerization of lower olefin building blocks and subsequent oxo synthesis. A typical composition of such a mixture is the following:

branched $C_{11}$-alkanol (isoundecanol) 2-15% by weight,
branched $C_{12}$-alkanol (isododecanol) 15-35% by weight,
isotridecanol 55-75% by weight and
branched $C_{14}$-alkanol (isotetradecanol) 1-10% by weight.

The "$C_{13}/C_{15}$-oxo alcohols", which are mixtures of corresponding linear olefins, i.e. alpha-dodecene and alpha-tetradecene, which have been hydroformylated, are to be distinguished from the isotridecanol used in the present invention. The $C_{13}$- and $C_{15}$-alkanols obtained are linear and have not more than one branch.

The degrees of alkoxylation x and y which, as a rule, are average values since a random distribution of the alkylene oxide units having a frequency maximum is generally present, are preferably, independently of one another, numbers from 1.5 to 12. By means of special alkoxylation catalysts, for example modified bentonites or hydrotalcites, as described in WO-A 95/04024, the random distribution can be greatly restricted so that narrow-range alkoxylates are obtained.

The block-like isotridecanol alkoxylates (V) described are either ethylene oxide/propylene oxide or butylene oxide adducts of the formula (Va)

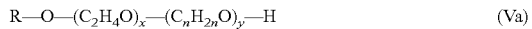

where n=3 or 4 (Va) or propylene oxide or butylene oxide/ethylene oxide adducts of the formula (Vb)

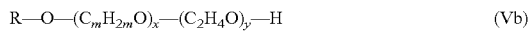

where m=3 or 4 (Vb).

If m or n is the number 3 or 4, the number 3 (propylene oxide block) is preferred.

The ratio of variables x and y, which is one of the decisive factors with regard to the balance between hydrophilic and hydrophobic molecular moieties, is greater than or equal to 1 in the case of the adducts (Va); preferably the ratio of x to y is from 1:1 to 4:1, in particular from 1.5:1 to 3:1.

The ratio of the variables x and y in the case of the adducts (Vb) is somewhat less critical and is as a rule from 1:3 to 3:1, preferably from 1:1.5 to 3:1.

Another suitable class of nonionic surfactants comprises endcapped alcohol alkoxylates, in particular of abovementioned alcohol alkoxylates. In a preferred embodiment, they are the corresponding endcapped alcohol alkoxylates of the alcohol alkoxylates of the general formulae (I), (II), (III) and (V). The endcapping can be effected, for example, with dialkyl sulfate, $C_{1-10}$-alkyl halides, phenyl halides, preferably chlorides or bromides, particularly preferably cyclohexyl chloride, cyclohexyl bromide, phenyl chloride or phenyl bromide.

Examples of endcapped alkoxylates are also described in DE-A 37 26 121, the entire disclosure thereof in this context being hereby incorporated by reference in the present invention. In a preferred embodiment, these alcohol alkoxylates have the general structure (VI)

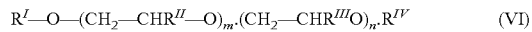

where
$R^I$ is hydrogen or $C_1$-$C_{20}$-alkyl,
$R^{II}$ and $R^{III}$ are identical or different and, in each case independently of one another, are hydrogen, methyl or ethyl,
$R^{IV}$ is $C_1$-$C_{10}$-alkyl, preferably $C_1$-$C_4$-alkyl, or cyclohexyl or phenyl,
m' and n' are identical or different and are greater than or equal to 0,
with the proviso that the sum of m' and n' is from 3 to 300.

These compounds are prepared by reacting polyoxyalkylene compounds of the formula (VII)

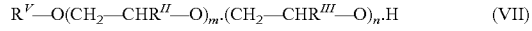

where $R^V$ is hydrogen or $C_1$-$C_{20}$-alkyl and $R^{II}$, $R^{III}$, m' and n' in each case have the abovementioned meaning, with a dialkyl sulfate of the formula (VIII)

$(R^{IV}O)_2SO_2$ (VIII) or a $C_1$-$C_{10}$-alkyl halide, in particular $C_1$-$C_4$-alkyl halide, preferably chloride or bromide, cyclohexyl or phenyl halide, preferably chloride or bromide, where $R^{IV}$ has the abovementioned meaning, in the presence of an alkali metal hydroxide. The reaction is carried out at a temperature of from 20 to 60° C. in the presence of an aqueous solution of an alkali metal hydroxide, the concentration of alkali metal hydroxide not being permitted to be less than 35% by weight, based on the aqueous phase, during the entire duration of the reaction and at least 1 mol of dialkyl sulfate of the formula (VIII) and at least one mole of alkali metal hydroxide being used per mole equivalent of organic hydroxyl groups. All alkyl groups occurring in the abovementioned formulae (VI), (VII) and (VIII) may be both straight-chain and branched. $R^I$, $R^{IV}$ and $R^V$ are, for example, methyl, ethyl, propyl, isopropyl, butyl, isobutyl or sec-butyl.

$R^I$ and $R^V$ are furthermore, for example, pentyl, isopentyl, sec-pentyl, tert-pentyl, hexyl, 2-methylpentyl, heptyl, octyl, 2-ethylhexyl, isooctyl, nonyl, isononyl, decyl, isodecyl, undecyl, dodecyl, tridecyl, 3,5,5,7-tetramethylnonyl, isotridecyl, tetradecyl, pentadecyl, hexadecyl, heptadecyl, octadecyl, nonadecyl or eicosyl (the names isooctyl, isononyl, isodecyl and isotridecyl are trivial names and originate from the alcohols obtained by the oxo synthesis—cf. in this context Ullmann, Enzyklopädie der Technischen Chemie, 4th Edition, Volume 7, pages 215 to 217, and Volume 11, pages 435 and 436). Preferably used starting materials are polyoxyalkylene derivatives of the formula (VI), where $R^V$ is hydrogen or $C_8$-$C_{16}$-alkyl.

Polyoxyalkylene derivatives of the formula (VII) which are furthermore preferred are those in which the sum of m' and n' is from 3 to 10 or from 50 to 100.

A preferred alkylating agent is a dialkyl sulfate of the formula (VIII), where $R^{IV}$ is ethyl or in particular methyl.

If such polyoxyalkylene derivatives of the formula (VII), where $R^V$ is hydrogen, are used as starting materials, a dietherification is effected. In this case, etherified polyoxyalkylene derivatives of the formula (VI), where $R^I$ is identical to $R^{IV}$, are obtained.

Another class of nonionic surfactants comprises alkylpolyglucosides having preferably 6 to 22, particularly preferably 10 to 18, carbon atoms in the alkyl chain. These compounds generally comprise from 1 to 20, preferably from 1.1 to 5, glucoside units.

Another class of nonionic surfactants comprises N-alkyl-glucamides of the general structures

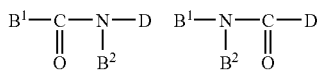

where $B^1$ is a $C_6$- to $C_{22}$-alkyl, $B^2$ is hydrogen or $C_1$- to $C_4$-alkyl and D is a polyhydroxyalkyl radical having 5 to 12 carbon atoms and at least 3 hydroxyl groups. $B^1$ is preferably $C_{10}$- to $C_{18}$-alkyl, $B^2$ is $CH_3$ and D is a $C_5$- or $C_6$-radical. For example, such compounds are obtained by acylation of reductively aminated sugars with acid chlorides of $C_{10}$- to $C_{18}$-carboxylic acids.

Further suitable nonionic surfactants are the endcapped fatty acid amide alkoxylates which are disclosed in WO-A 95/11225 and are of the general formula

where
$R^I$ is a $C_5$- to $C_{21}$-alkyl or alkenyl radical,
$R^2$ is a $C_1$- to $C_4$-alkyl group,
$A^I$ is $C_2$- to $C_4$-alkylene,
y is the number 2 or 3 and
x has a value of from 1 to 6.

Examples of such compounds are the reaction products of n-butyltriglycolamine of the formula $H_2N$—$(CH_2$—$CH_2$—$O)_3$—$C_4H_9$ with methyl dodecanoate or the reaction products of ethyltetraglycolamine of the formula $H_2N$—$(CH_2$—$CH_2$—$O)_4$—$C_2H_5$ with a commercial mixture of saturated $C_8$- to $C_{18}$-fatty acid methyl esters.

Polyhydroxy- or polyalkoxy-fatty acid derivatives, such as polyhydroxy-fatty acid amides, N-alkoxy- or N-aryloxypolyhydroxy-fatty acid amides, fatty acid amide ethoxylates, in particular encapped ones, and fatty acid alkanolamide alkoxylates are furthermore suitable as nonionic surfactants.

Block copolymers of ethylene oxide, propylene oxide and/or butylene oxide (Pluronic® and Tetronic® brands from BASF AG and BASF Corp., respectively) are furthermore suitable as nonionic surfactants. In a preferred embodiment, they are three-block copolymers having polyethylene/polypropylene/polyethylene blocks and a molecular weight of from 4000 to 16 000, the amount by weight of the polyethyene blocks being from 55 to 90%, based on the three-block copolymer. Three-block copolymers having a molecular weight of more than 8000 and a polyethylene content of from 60 to 85% by weight, based on the three-block copolymer, are particularly preferred. These preferred three-block copolymers are commercially available in particular under the names Pluronic F127, Pluronic F108 and Pluronic F98, in each case from BASF Corp., and are described in WO 01/47472 A2, the entire disclosure of which in this context is hereby incorporated by reference in the present invention.

In addition, block copolymers of ethylene oxide, propylene oxide and/or butylene oxide which are blocked at one or both ends can also preferably be used. Blocking at one end is achieved, for example, by using an alcohol, in particular a $C_{1-22}$-alkyl alcohol, for example methanol, as a starting compound for the reaction with an alkylene oxide. In addition, for example, endcapping at both ends can be effected by reaction of the free block copolymer with dialkyl sulfate, $C_{1-10}$-alkyl halides, phenyl halides, preferably chlorides or bromides, particularly preferably cyclohexyl chloride, cyclohexyl bromide, phenyl chloride or phenyl bromide.

Individual nonionic surfactants or a combination of different nonionic surfactants may additionally be used. It is possible to use nonionic surfactants from only one class, in particular only alkoxylated $C_4$- to $C_{22}$-alcohols. Alternatively, however, it is also possible to use surfactant mixtures from different classes.

The concentration of nonionic surfactant in the composition according to the invention may vary depending on the leaching conditions, in particular as a function of the material to be leached. The nonionic surfactant is preferably soluble in the aqueous cyanide-containing composition in a concentration which permits a significant increase in the extraction content of gold or silver, a significant reduction in the duration of leaching or a significant reduction in the required amount of cyanide salts in the liquor. The concentration of the nonionic surfactant in the composition according to the invention is therefore preferably from 0.01 to 0.1% by weight, particularly preferably from 0.02 to 0.09% by weight, in particular from 0.025 to 0.75% by weight, especially from 0.03 to 0.07% by weight.

It should be expressly pointed out that the compositions according to the invention can be applied in different concentration ranges during the extraction process (gradient procedure). In addition, the surface-active substances (as part of the composition) can be added partly or completely even before the beginning of the extraction process to the starting material or rock, for example during milling of the material.

According to the invention, the amount of nonionic surfactant used is from 1 to 30 ppm, preferably from 1 to 20 ppm, particularly preferably from 2 to 15 ppm, in particular from 3 to 10 ppm, per metric ton of starting material. It has proven to be advantageous to use a higher concentration at the beginning of the extraction process than before the end of the leaching.

Moreover, the composition according to the invention may additionally comprise at least one anionic surfactant and/or at least one cationic surfactant and/or at least one amphoteric surfactant.

In a preferred embodiment, the at least one anionic surfactant is selected from the group consisting of fatty alcohol sulfates, sulfated alkoxylated alcohols, alkanesulfonates, N-acyl sarcosinates, alkylbenzenesulfonates, olefin sulfonates and olefin disulfonates, alkyl ester sulfonates, sulfonated polycarboxylic acids, alkylglyceryl sulfonates, fatty acid glyceryl ester sulfonates, alkylphenol polyglycol ether sulfates, paraffinsulfonates, alkyl phosphates, acyl isothionates, acyl taurates, acylmethyl taurates, alkylsuccinic acids, alkenylsuccinic acids or the monoesters or monoamides thereof, alkylsulfosuccinic acids or the amides thereof, mono- and diesters of sulfosuccinic acids, sulfated alkylpolyglycosides, alkylpolyglycol carboxylates and hydroxyalkyl sarcosinates.

Suitable anionic surfactants are fatty alcohol sulfates or fatty alcohols having, for example, 8 to 22, preferably 10 to 18, carbon atoms, $C_{12}$-$C_{18}$-alcohol sulfates, lauryl sulfate, cetyl sulfate, myristyl sulfate, palmityl sulfate, stearyl sulfate and tallow fatty alcohol sulfate.

Further suitable anionic surfactants are sulfated ethoxylated $C_8$- to $C_{22}$-alcohols (alkyl ether sulfates) or the soluble salts thereof. Compounds of this type are prepared, for example, by first alkoxylating a $C_8$- to $C_{22}$-alcohol, preferably a $C_{10}$- to $C_{18}$-alcohol, e.g. a fatty alcohol, and then sulfating the alkoxylation product. Ethylene oxide is preferably used for the alkoxylation, from 1 to 50, preferably from 1 to 20, mol of ethylene oxide being used per mole of alcohol.

The alkoxylation of the alcohols can, however, also be carried out with propylene oxide alone or, if appropriate, butylene oxide. Those alkoxylated $C_8$- to $C_{22}$-alcohols which comprise ethylene oxide and propylene oxide or ethylene oxide and butylene oxide or ethylene oxide and propylene oxide and butylene oxide are also suitable. The alkoxylated $C_8$- to $C_{22}$-alcohols may comprise the ethylene oxide, propylene oxide and butylene oxide units in the form of blocks or in random distribution. Depending on the type of alkoxylation catalyst, alkyl ether sulfates having a broad or narrow alkylene oxide homolog distribution may be obtained.

Further suitable anionic surfactants are alkanesulfonates, such as $C_8$- to $C_{24}$-alkanesulfonates, preferably $C_{10}$- to $C_{18}$-alkanesulfonates, and soaps, such as, for example, sodium and potassium salts of saturated and/or unsaturated $C_8$- to $C_{24}$-carboxylic acids.

Further suitable anionic surfactants are linear $C_8$- to $C_{20}$-alkylbenzenesulfonates ("LAS"), preferably linear $C_9$- to $C_{13}$-alkylbenzenesulfonates and $C_9$- to $C_{13}$-alkyltoluenesulfonates.

$C_8$- to $C_{24}$-olefinsulfonates and -disulfonates, which may also be mixtures of alkene- and hydroxyalkanesulfonates or -disulfonates, alkyl ester sulfonates, sulfonated polycarboxylic acids, alkylglyceryl sulfonates, fatty acid glyceryl ester sulfonates, alkylphenol polyglycol ether sulfates, paraffinsulfonates having about 20 to about 50 carbon atoms (based on paraffin or paraffin mixtures obtained from natural sources), alkyl phosphates, acyl isethionates, acyl taurates, acylmethyl taurates, alkylsuccinic acids, alkenylsuccinic acids or the monoesters or monoamides thereof, alkylsulfosuccinic acids or the amides thereof, mono- and diesters of sulfosuccinic acids, acyl sarcosinates, sulfated alkylpolyglucosides, alkylpolyglycol carboxylates and hydroxyalkyl sarcosinates are furthermore suitable as anionic surfactants.

The anionic surfactants are added to the composition according to the invention preferably in the form of salts. Suitable cations in these salts are alkali metal ions, such as sodium, potassium and lithium, and ammonium salts, such as, for example, hydroxyethylammonium, di(hydroxyethyl)ammonium and tri(hydroxyethyl)ammonium salts.

Individual anionic surfactants or a combination of different anionic surfactants may be used. It is possible to use anionic surfactants from only one class, for example only fatty alcohol sulfates or only alkylbenzenesulfonates, but it is also possible to use surfactant mixtures from different classes, for example a mixture of fatty alcohol sulfates and alkylbenzenesulfonates.

In the composition according to the invention, the anionic surfactant may replace up to 99%, preferably up to 60%, particularly preferably up to 30%, in particular up to 10%, of the nonionic surfactant.

In addition, the composition according to the invention may comprise a cationic surfactant which is selected from the group consisting of tetraalkylammonium salts, imidazolinium salts and amine oxides.

Furthermore, cationic surfactants as described in WO 99/19435 may be used. Examples are $C_8$- to $C_{16}$-dialkyldimethylammonium salts, dialkoxydimethylammonium salts and imidazolinium salts having a long-chain alkyl radical.

In the composition according to the invention, the cationic surfactant may replace up to 99%, preferably up to 60%, particularly preferably up to 30%, in particular up to 10%, of the nonionic surfactant.

If an amphoteric surfactant is used in the composition according to the invention, it may be selected from the group consisting of the surfactants comprising carboxylic acids, preferably ethylenically unsaturated carboxylic acids, and furthermore at least one ethylenically unsaturated monomer unit of the general formula (IX)

$$R^1(R^2)C=C(R^3)R^4 \qquad (IX),$$

where $R^1$ to $R^4$, independently of one another, are —H, —$CH_3$, a straight-chain or branched saturated alkyl radical having 2 to 12 carbon atoms, a straight-chain or branched, mono- or polyunsaturated alkenyl radical having 2 to 12 carbon atoms, alkyl or alkenyl radicals as defined above which are substituted by —$NH_2$, —OH or —COOH, a heteroatomic group having at least one positively charged group, a quaternized nitrogen atom or at least one amino group having a positive charge in the pH range from 2 to 11 or are —COOH or —COOR$^5$, where $R^5$ is a saturated or unsaturated, straight-chain or branched hydrocarbon radical having 1 to 12 carbon atoms.

Examples of the abovementioned monomer units of the formula (I) are diallylamine, methyldiallylamine, tetramethylammonium salts, acrylamidopropyl(trimethyl)ammonium salts ($R^1$, $R^2$ and $R^3$=H, $R^4$=C(O)NH(CH$_2$)$_2$N$^+$(CH$_3$)$_3$ X$^-$), methacrylamidopropyl(trimethyl)ammonium salts ($R^1$ and $R^2$=H, $R^3$=CH$_3$, H, $R^4$=C(O)NH(CH$_2$)$_2$N$^+$(CH$_3$)$_3$X$^-$).

Particularly preferred amphoteric surfactants comprise, as monomer units, derivatives of diallylamine, in particular dimethyldiallylammonium salt and/or methacrylamidopropyl(trimethyl)ammonium salt, preferably in the form of the chloride, bromide, iodide, hydroxide, phosphate, sulfate, hydrogen sulfate, ethylsulfate, methylsulfate, mesylate, tosylate, formate or acetate, in combination with monomer units from the group consisting of the ethylenically unsaturated carboxylic acids.

It is possible to use individual amphoteric surfactants or a combination of different amphoteric surfactants. It is possible to use amphoteric surfactants from only one class, but it is also possible to use surfactant mixtures from different classes.

In the composition according to the invention, the amphoteric surfactant may replace up to 99%, preferably up to 60%, particularly preferably up to 30%, in particular up to 10%, of the nonionic surfactant.

The composition according to the invention has a pH of, preferably, from 8 to 13, particularly preferably from 9 to 12, in particular from 9 to 11. The cyanide content of the composition according to the invention is preferably from 100 to 500 ppm, particularly preferably from 100 to 400 ppm, in particular from 100 to 300 ppm.

It is furthermore preferable if the composition according to the invention additionally comprises preferably from 100 to 500 ppm, particularly preferably from 100 to 400 ppm, in particular from 100 to 200 ppm, of lime.

In addition, the composition according to the invention may additionally comprise at least one flocculant. Corresponding examples are mentioned in "The Extractive Metallury of Gold in South Africa", The South African Institute of Mining and Metallurgy, Vol. 1, 1987, pages 287 and 288, the entire disclosure of which is hereby incorporated by reference in the present invention. Suitable examples are polyacrylamides and lime.

These dispersants can optionally also act as scale inhibitors, because they disperse calcium carbonate $CaCO_3$ which is formed in the alkaline medium, and thus, e.g. prevent a clogging of jets or the formation of scales in pipes.

Independently thereof, the composition according to the invention can comprise at least one further scale inhibitor.

Suitable scale inhibitors are described, e.g. in WO 04/055052, where (meth)acrylic acid copolymers are disclosed, which comprise
a) from 50 to 80% by weight of a poly(meth)acrylic acid basic structure,
b) from 1 to 40% by weight of at least one unit which is bound to the basic structure and is selected from the group consisting of isobutene units, terelactone units and isopropanol units and
c) from 5 to 50% by weight of amide units based on aminoalkylsulfonic acids,
the total weight of the units in the sulfone-containing polymer being 100% by weight, and all weights being based on the sulfone-containing polymer.

The (meth)acrylic acid copolymers according to WO 04/099092 preferably show a weight average molecular weight of the sulfonic acid containing polymer of from 1,000 to 20,000 g/mol and can be produced preferably by the following process steps:
1) free-radical polymerization of (meth)acrylic acid in the presence of isopropanol with or without water, with a polymer I resulting, and
2) amidating the polymer I originating from process 1) by reaction with at least one aminoalkanesulfonic acid.

A further suitable scale inhibitor can be mentioned for example:
  polycarboxylic acid semiamides, which are obtainable by reaction of polymers containing anhydride groups and compounds containing amino groups (according to DE 195 48 318),
  silicic acid (according to EP 0 556 162),
  vinyl lactic acid and/or isopropenyl lactic acid (according to DE 197 195 16),
  homopolymers of acrylic acid (according to U.S. Pat. No. 3,756,257),
  copolymers from acrylic acid and/or (meth)acrylic acid and vinyl lactic acid and/or isopropenyl lactic acid,
  copolymers of styrole and vinyl lactic acid,
  copolymers of maleic acid and lactic acid,
  water soluble and water dispersible graft polymers, obtainable by radically initiated graft polymerization of
    I) at least one monoethylenically unsaturated monomer on
    II) polymers of a molecular weight from 200 to 5,000 of monoethylenically unsaturated dicarboxylic acids or their anhydrides, where 5 to 2,000 parts by weight of I) are used per 100 parts by weight of graft base II) (DE 195 03/546),
  optionally hydrolyzed polymaleic anhydrides and their salts (according to U.S. Pat. No. 3,810,834, GB-A-1 454 657 and EP-A-0 261 589),
  iminodisuccinates (according to DE 101 02 209),
  formulations, containing complex forming agents like ethylene diamine tetraacetic acid (EDTA) and/or diethylene-triaminepentaacetic acid (DTPA) (according to U.S. Pat. No. 5,366,016),
  phosphonates,
  polyacrylates,
  polyasparagic acids or polyasparagic acids modified according to DE 44 34 463,
  polyasparagic acid imides,
  hydroxamic acid, hydroxamic acid ether and/or hydrazide groups containing polymers (according to DE 44 27 630),
  optionally hydrolyzed polymers of maleinimide (according to DE 43 42 930),
  naphthyl aminopolycarboxylates (according to EP 0 538 969),
  oxaalkanepolyphosphonic acids (according to EP 330 075),
  polyhydroxy alkene-amino-bis-methylene phosphonic acids (according to DE 40 16 753), and
  oxidized glucosanes (according to DE 43 30 359).

The above-mentioned documents are incorporated by reference with respect to the respective scale inhibitors.

In addition, the composition according to the invention may additionally comprise at least one dispersant, for example selected from the group consisting of salts of naphthalenesulfonic acids, condensates of naphthalenesulfonic acids and formaldehyde, and polycarboxylates. Corresponding dispersants are commercially available, for example, under the trade names Tamol®, Sokalan® and Nekal® from BASF AG and under the trade name Solsperse® from Lubrizol.

The present invention furthermore relates to an aqueous cyanide-containing composition comprising a nonionic surfactant which is selected from the group consisting of alcohol alkoxylates which are alkoxylated with propylene oxide or butylene oxide; alcohol alkoxylates which are alkoxylated with at least two different alkylene oxides selected from the group consisting of ethylene oxide, propylene oxide and butylene oxide; alkoxylated fatty acid esters which are alkoxylated with propylene oxide or butylene oxide; alkoxylated fatty acid esters which are alkylated with at least two different alkoxylates selected from the group consisting of ethylene oxide, propylene oxide and butylene oxide; alkylphenol alkoxylates which are alkoxylated with propylene oxide or butylene oxide; alkylphenol alkoxylates which are alkoxylated with at least two different alkoxylates selected from the group consisting of ethylene oxide, propylene oxide and butylene oxide; alkylpolyglucosides; N-alkylpolyglucosides; N-alkylglucamides; fatty acid polyglycol esters; fatty acid amine alkoxylates; fatty acid amide alkoxylates; fatty acid alkanolamide alkoxylates; N-alkoxypolyhydroxy-fatty acid amides; N-aryloxypolyhydroxy-fatty acid amides; block copolymers of ethylene oxide, propylene oxide and/or butylene oxide; polyisobutene alkoxylates; polyisobutene/maleic anhydride derivatives; fatty acid glycerides; sorbitan esters; polyhydroxy-fatty acid derivatives; polyalkoxy-fatty acid derivatives; bisglycerides and mixtures thereof.

For further features of this second composition according to the invention, in particular with regard to preferred surfactants of the individual surfactant classes, reference is made to the above statements regarding the first composition according to the invention.

The present invention furthermore relates to a process for extracting metals, in particular gold and/or silver, from metal-containing materials.

The process according to the invention is then characterized by the following process steps:
(a) provision of an optionally milled metal-containing material,
(b) provision of a composition according to the invention and
(c) bringing of the metal-containing material into contact with the above-described composition according to the invention in the presence of an oxidizing agent, a mother liquor enriched with metal cyanide complexes being obtained.

In a particular embodiment of the present invention, the process steps (a), (b) and (c) are followed by the following process steps (d) and (e):

(d) separation of the metal complex from the composition and (e) reduction of the complexed metal to give the elemental metal.

The process according to the invention is suitable in principle for extracting any metal from a starting material comprising the corresponding metal, provided that the metal forms a substantially soluble compound with the cyanide and can thus be dissolved out of the starting material. In a preferred embodiment of the present invention, the process is suitable for extracting gold, silver and/or platinum. In a particularly preferred embodiment, the process according to the invention is suitable for extracting gold and/or silver. Below, the extraction of the noble metals gold and/or silver is described in more detail. The statements apply in their generality also to all other metals which can be extracted by the process according to the invention.

The process according to the invention is preferably carried out by creating a heap of the noble metal-containing material and then spraying it from above with the composition according to the invention. The spraying of the gold-containing material is preferably effected dropwise. After the separation of the gold cyanide complex from the composition, this can be used again for further leaching processes.

Oxidizing agents used in the process according to the invention are, for example, oxygen, for example in the form of atmospheric oxygen, hydrogen peroxide and other suitable oxidizing agents.

A mixture which, in addition to other metals or metal compounds, comprises gold in metallic form is preferably used as gold-containing material.

In a preferred embodiment of the process according to the invention, the gold-containing material comprises metallic gold, if appropriate as an alloy with silver and/or other noble metals and/or contaminated with impurities of other metals and/or together with metal ores.

The gold-containing material occurs, for example, in pure form or in bound form, for example as ores.

The gold-containing material is preferably selected from the group consisting of gold-containing quartz, gold-containing pyrites, sylvanite, (AuAgTe$_4$), nagyagite, (Pb, Au) (S, Te, Sb)$_{1-2}$) and calvaite (krennerite, AuTe$_2$).

In a further embodiment of the present invention, the gold-containing material is electronic scrap.

The electronic scrap may originate, for example, from circuit boards of electronic assemblies, comminuted semiconductor modules, such as, for example, integrated circuits, from the residues of dry batteries after the pyrolytic treatments thereof or from the residues remaining from mechanical electronic scrap recycling processes.

For example, sulfidic silver ores, such as silver glance (argentite) Ag$_2$S, stromeyerite CuAgS (="CuS.Ag$_2$S") and silver double sulfides with arsenic sulfide and antimony sulfide, e.g. fahlore (Cu, Ag)$_3$(Sb, As)S$_3$ (="3(Cu, Ag)$_2$S.(Sb, As)$_2$S$_3$"), proustite (light red silver ore) Ag$_3$AsS$_3$ (="3Ag$_2$S.As$_2$S$_3$"), pyrargyrite (dark red silver ore) Ag$_3$SbS$_3$ (="3Ag$_2$S.Sb$_2$S$_3$"), miargyrite AgSbS$_2$ (="Ag$_2$S.Sb$_2$S$_3$") and horn silver AgCl (chlorargyrite) or AgBr (bromargyrite), can be used as silver-containing materials.

It is preferable if the metal-containing material to be extracted has a specific size. If the individual material particles to be extracted are too large, the yield of leached metal is too low. On the other hand, an excessively small particle size leads to very low flow rates of the composition according to the invention through the metal-containing material. The metal-containing material is therefore generally subjected to one or more milling steps prior to the leaching process. If one or more milling steps are carried out, they can preferably be carried out in the presence of the nonionic surfactant provided according to the invention, for example in the form of an aqueous solution. If appropriate, the addition of the nonionic surfactant in the actual cyanide leaching can then be dispensed with.

If appropriate, depending on the type of metal-containing material, in particular in the case of gold and silver extraction, especially in the case of gold extraction, it is advantageous if the milled material is subjected to an agglomeration step prior to the actual cyanide leaching. If an agglomeration step is implemented, it can preferably be carried out in the presence of the nonionic surfactant provided according to the invention, for example in the form of an aqueous solution. If appropriate, it is then possible to dispense with the addition of the nonionic surfactant in the actual cyanide leaching. As a result of the surfactant addition during the agglomeration, substantially complete wetting of the metal-containing material with a cyanide-containing aqueous solution can be ensured. The agglomerating agent is generally prepared by mechanical mixing of from 2 to 10 kg of lime or cement, particularly preferably Portland cement, per metric ton of metal-containing material to be agglomerated, with from 8 to 16% of an aqueous, optionally cyanide-containing solution, preferably with addition of the nonionic surfactant provided according to the invention.

In a further embodiment of the present invention, it is also possible to apply the nonionic surfactant provided according to the invention independently of an aqueous cyanide-containing solution, for example as a separate aqueous solution, to the material to be leached. This can be effected preferably immediately before, after or during the application of the aqueous cyanide-containing solution. Depending on the material to be leached, it may be sufficient if the nonionic surfactant provided according to the invention is used only in the first passes of the cyanide leaching, for example for one or two days, while thereafter either gradually less surfactant can be used (gradient procedure) or the surfactant addition can be dispensed with.

The working-up of the metal-containing cyanide complex solutions thus obtained is effected by a method known to the person skilled in the art, for example by adsorption on active carbon or ion exchangers and reduction by addition of zinc or by an electrochemical method.

The present invention furthermore relates to the use of nonionic surfactants which, in a concentration of from 0.01 to 0.2% by weight, particularly preferably from 0.01 to 0.1% by weight, in particular from 0.01 to 0.05% by weight, in an aqueous solution adjusted to a pH of from 9.8 to 10.2 with NaOH, at 23° C., lead to a reduction in the contact angle on glass after 1 second, particularly preferably after 0.5 second, by at least 10°, particularly preferably at least 20°, in particular at least 30°, especially at least 40°, in the cyanide leaching for extracting metals, preferably gold, silver and/or platinum, particularly preferably gold and/or silver.

In addition, the present invention relates to the use of nonionic surfactants selected from the group consisting of alcohol alkoxylates which are alkoxylated with propylene oxide or butylene oxide; alcohol alkoxylates which are alkoxylated with at least two different alkylene oxides selected from the group consisting of ethylene oxide, propylene oxide and butylene oxide; alkoxylated fatty acid esters which are alkoxylated with propylene oxide or butylene oxide; alkoxylated fatty acid esters which are alkylated with at least two different alkoxylates selected from the group consisting of ethylene oxide, propylene oxide and butylene oxide; alkylphenol alkoxylates which are alkoxylated with propylene oxide or butylene oxide; alkylpolyglucosides; N-alkylpolyglucosides; N-alkylglucamides; fatty acid polyglycol esters; fatty acid amine alkoxylates; fatty acid amide alkoxylates; fatty acid alkanolamide alkoxylates; N-alkoxypolyhydroxy-fatty acid amides; N-aryloxypolyhydroxy-fatty acid amides; block copolymers of ethylene oxide, propylene oxide and/or butylene oxide; polyisobutene alkoxylates; polyisobutene/maleic anhydride derivatives; fatty acid glycerides; sorbitan esters; polyhydroxy-fatty acid derivatives; polyalkoxy-fatty acid derivatives; bisglycerides and mixtures thereof in the cyanide leaching for extracting metals, preferably gold, silver and/or platinum, particularly preferably gold and/or silver.

The invention is further illustrated by the following examples without limiting it thereby.

Determination of the Contact Angle

The contact angle was measured with a video based high velocity measuring instrument for contact angle determination of the type OCAH 200 of the company Dataphysics Instruments GmbH, Raiffeisenstr. 34, Fildersstadt, on an extra-white glass slide from Gerhard Menzel Glasbearbeitungswerke GmbH & Co. Kg, Braunschweig. The surfactants or surfactant combinations according to the invention listed in Table 1 are used in an aqueous solution basified to pH 10 by sodium hydroxide at the concentrations (% by weight) listed in Table 2. The contact angel is determined at 23° C. one second after application. Under these conditions the contact angel of the sodium hydroxide solution of pH 10 without added surfactant is 51°. Accordingly, examples not according to the invention are listed in Table 3. The statements regarding the ethylene oxide (EO) or propylene oxide (PO) content are to be understood as molar, based on 1 mol of alcohol (Table 1). The alkoxylation was carried out blockwise in the indicated order or by random/mix.

Column Tests

Column tests, where representative samples of the gold containing rock are packed into columns and leached with alkaline cyanide solution, are used as a model for the industrially carried out heap leaching The addition of surfactants according to the invention results in an increase of the gold yield and/or improved kinetics of the leaching or a reduction of the amount of cyanides necessary for leaching.

To check the improved efficacy of the claimed compositions containing surfactants, aqueous solutions containing 0.05% NaCN, which had been basified to pH 10 by sodium hydroxide, and 50-200 ppm surfactant respectively, were used in comparison to the respective solutions containing no surfactants. Leaching was carried out for 30 days under continuous or discontinuous addition of surfactant at a flow rate of 180 ml/day per kg ore.

The columns had an inner diameter of 12 cm, a length of 100 cm and were filled with approximately 25 kg of ore. The ore was ground to a particle size x of $0.5 \leq x \leq 2.5$ cm and sieved. The gold content was 0.5 to 1.5 g/t of rock. Ores from the mines Minera Yanacocha, SRL, Oeste Pit or Quinua Pit, Cajamarca, Peru and Minera Nueva Calif., Carretea Mancos km 15, Distrito de Mancos, Provincia Yungoy, Ancash-Peru, were used. The results are summarized in Table 4.

TABLE 1

| Surfactant system Example No. | Chemical composition |
|---|---|
| 1 | $C_{10}$ Guerbet-alcohol + 1.2 PO + 4.8 EO |
| 2 | $C_{10}$ Guerbet-alcohol + 1.8 PO + 6.6 EO |
| 3 | $C_{10}$ Guerbet-alcohol + 5 EO |
| 4 | $C_{10}$ Guerbet-alcohol + 7.9 EO |
| 5 | $C_{10}$-oxo-alcohol + 10.1 EO |
| 6 | $C_{13}$-$C_{15}$-oxo-alcohol + 6.1 EO + 3.2 PO, end groups capped with DMS (dimethyl sulfate) |
| 7 | $C_{13}$-oxo-alcohol + 5.8 EO + 2.5 PO |
| 8 | $C_{13}$-oxo-alcohol + 5.8 EO + 2.5 PO/n-hexanol + 5 EO 70/30 wt.-% |
| 9 | $C_{13}$ $C_{15}$-oxo alcohol + 6.5 EO + 2 BuO, end groups capped with DMS (dimethyl sulfate) |
| 10 | $C_9C_{11}$-oxo-alcohol + 6.7 EO + 6.5 PO (Random/Mix) |
| 11 | $C_{13}C_{14}$-oxo-alcohol + 6.5 EO + 2 BuO end groups capped with DMS (dimethyl sulfate)/44 PO + 38 EO 60/40 wt.-% |
| 12 | Pluronic ® PE 3100 (PO-EO-blockpolymer, BASF AG, Ludwigshafen) |
| 13 | Pluronic ® PE 6800 (PO-EO-blockpolymer, BASF AG, Ludwigshafen) |
| 14 | Emulan ® HE 50 (alcohol ethoxylate, BASF AG, Ludwigshafen) |
| 15 | Plurafac ® LF 403 (fatty alcohol ethoxylate, BASF AG, Ludwigshafen) |
| 16 | Lutensol ® AT 11 ($C_{16}C_{18}$ fatty alcohol ethoxylate, BASF AG, Ludwigshafen) |
| 17 | Texapon ® NSO (aqueous solution, laurylether sulfate Na-salt, Cognis, Düsseldorf) |

TABLE 2

| Surfactant System Example No. | Wt.-% in aqueous NaOH, pH 10 | Contact Angle [°] after 1 sec at 23° C. |
|---|---|---|
| 1 | 0.05 | 23 |
| 1 | 0.20 | 18 |
| 2 | 0.05 | 22 |
| 2 | 0.10 | 11 |
| 3 | 0.10 | 16 |
| 4 | 0.10 | 17 |
| 5 | 0.05 | 12 |
| 5 | 0.01 | 18 |
| 6 | 0.05 | 23 |
| 7 | 0.01 | 21 |
| 7 | 0.05 | 11 |
| 8 | 0.05 | 32 |
| 9 | 0.01 | 26 |
| 9 | 0.1 | 19 |
| 7 | 0.03 | 16 |
| 7 | 0.1 | 09 |
| 10 | 0.003 | 22 |
| 10 | 0.005 | 17 |
| 11 | 0.005 | 28 |

TABLE 3

| Surfactant System | Wt.-% in aqueous NaOH, pH 10 | Contact Angle [°] after 1 sec at 23° C. |
|---|---|---|
| 12 | 0.2 | 49 |
| 13 | 0.2 | 46 |
| 14 | 0.2 | 44 |
| 15 | 0.2 | 47 |
| 16 | 0.2 | 48 |
| 17 | 0.2 | 43 |

TABLE 4

| Surfactant System Example No. | Concentrate ppm | Cumulated Au-Yield after | | | | Remarks |
|---|---|---|---|---|---|---|
| | | 5 days | 10 days | 20 days | 30 days | |
| — | — | 79 | 80.5 | 82 | 82 | Yanacocha Quinua Pit |
| 10 | 50 | 80 | 82 | 83 | 84 | Continuous addition of surfactant |
| 3 | 50 | 81 | 84 | 84.5 | 84.5 | Continuous addition of surfactant |
| 7 | 50 | 79.5 | 82 | 84 | 86 | Continuous addition of surfactant |
| — | — | 80.5 | 81 | 82 | 82 | Nueva California |
| 10 | 50 | 82 | 83 | 84.5 | 85 | Continuous addition of surfactant |
| 9 | 50 | 82.5 | 84 | 86 | 86 | Continuous addition of surfactant |
| 10 | 80 | 81 | 82 | 82 | 82.5 | 10 days then without addition of surfactant |
| — | 78 | 79 | 79.5 | 80 | 80 | Yanacocha, Oeste Pit |
| 11 | 79 | 80 | 81 | 82 | 83 | Continuous addition of surfactant |
| 9 | 79.5 | 81 | 82 | 84 | 84.5 | Continuous addition of surfactant |
| 6 | 79.5 | 80.5 | 81.5 | 83 | 83.5 | Continuous addition of surfactant |

We claim:

1. An aqueous composition, comprising:
(I) cyanide;
(II) at least one anionic surfactant selected from the group consisting of a $C_8$- to $C_{22}$-sulfated ethoxylated alcohol, a $C_8$- to $C_{24}$-alkanesulfonate, a linear $C_8$- to $C_{20}$-alkylbenzenesulfonate, a $C_8$- to $C_{24}$-olefin sulfonate, and a $C_8$- to $C_{24}$-olefin disulfonate; and
(III) a block-like isotridecanol alkoxylate nonionic surfactant of formula (Va):

$$R\text{—}O\text{—}(C_2H_4O)_x\text{—}(C_nH_{2n}O)_y\text{—}H \qquad (Va),$$

wherein:
R is an isotridecyl radical;
n is 3 or 4;
x and y are each independently a number from 1 to 20; and
a ratio of x to y is in a range from 1:1 to 4:1, wherein:
the aqueous composition has a contact angle on glass of less than 40°; and
the nonionic surfactant is selected such that when the nonionic surfactant is added in a concentration of from 0.01 to 0.2% by weight to an aqueous solution consisting of sodium hydroxide and water and adjusted to a pH of from 9.8 to 10.2 at 23° C., the contact angle of the surfactant-containing sodium hydroxide aqueous solution on glass after 1 second is reduced by at least 10° relative to the contact angle of the aqueous solution before the nonionic surfactant is added.

2. The composition according to claim 1, wherein the reduction in the contact angle on glass after 1 second is at least 20°.

3. The composition according to claim 1, wherein the reduction in the contact angle on glass after 1 second is at least 30°.

4. The composition according to claim 1, wherein the reduction in the contact angle on glass after 1 second is at least 40°.

5. The composition according to claim 1, wherein the ratio of x to y is in a range from 1.5:1 to 3:1.

6. The composition according to claim 1, wherein the anionic surfactant is a $C_8$- to $C_{22}$-sulfated ethoxylated alcohol.

7. The composition according to claim 1, wherein the anionic surfactant is a $C_8$- to $C_{24}$-alkanesulfonate.

8. The composition according to claim 7, wherein the anionic surfactant is a $C_{10}$- to $C_{18}$-alkanesulfonate.

9. The composition according to claim 1, wherein the anionic surfactant is a linear $C_8$- to $C_{20}$-alkylbenzenesulfonate.

10. The composition according to claim 9, wherein the anionic surfactant is a linear $C_9$- to $C_{13}$-alkylbenzenesulfonate.

11. The composition according to claim 1, wherein the anionic surfactant is a $C_8$- to $C_{24}$-olefin sulfonate.

12. The composition according to claim 1, wherein the anionic surfactant is a $C_8$- to $C_{24}$-olefin disulfonate.

13. An aqueous composition, comprising
(I) cyanide;
(II) at least one cationic surfactant selected from the group consisting of a $C_8$- to $C_{16}$-salt, a $C_8$- to $C_{16}$-dialkoxydimethylammonium salt, and an imidazolinium salt comprising a long-chain alkyl radical; and
(III) a block-like isotridecanol alkoxylate nonionic surfactant of formula (Va):

$$R\text{—}O\text{—}(C_2H_4O)_x\text{—}(C_nH_{2n}O)_y\text{—}H \qquad (Va),$$

wherein:
R is an isotridecyl radical;
n is 3 or 4;
x and y are each independently a number from 1 to 20; and
a ratio of x to y is in a range from 1:1 to 4:1, wherein:
the aqueous composition has a contact angle on glass of less than 40°; and
the nonionic surfactant is selected such that when the nonionic surfactant is added in a concentration of from 0.01 to 0.2% by weight to an aqueous solution consisting of sodium hydroxide and water and adjusted to a pH of from 9.8 to 10.2 at 23° C., the contact angle of the surfactant-containing sodium hydroxide aqueous solution on glass after 1 second is reduced by at least 10° relative to the contact angle of the aqueous solution before the nonionic surfactant is added.

14. The composition according to claim 13, wherein the reduction in the contact angle on glass after 1 second is at least 20°.

15. The composition according to claim 13, wherein the reduction in the contact angle on glass after 1 second is at least 30°.

16. The composition according to claim 13, wherein the reduction in the contact angle on glass after 1 second is at least 40°.

17. The composition according to claim 13, wherein the ratio of x to y is in a range from 1.5:1 to 3:1.

18. The composition according to claim 13, wherein the cationic surfactant is a $C_8$- to $C_{16}$-dialkyldimethylammonium salt.

19. The composition according to claim 13, wherein the cationic surfactant is a $C_8$- to $C_{16}$-dialkoxydimethylammonium salt.

20. The composition according to claim 13, wherein the cationic surfactant is an imidazolinium salt comprising a long-chain alkyl radical.

* * * * *